US006238053B1

(12) United States Patent
Crocquet

(10) Patent No.: US 6,238,053 B1
(45) Date of Patent: May 29, 2001

(54) PROTECTIVE ASSEMBLY FOR AN OPTICAL DEVICE

(76) Inventor: Wendy Gail Crocquet, 1290 NW. 89th Dr., Coral Springs, FL (US) 33071

( * ) Notice: Subject to any disclaimer, the term of this patent is extended or adjusted under 35 U.S.C. 154(b) by 0 days.

(21) Appl. No.: 09/568,878

(22) Filed: May 9, 2000

(51) Int. Cl.[7] .................................................. G02B 21/00
(52) U.S. Cl. ........................ 359/611; 359/612; 359/610; 359/407; 359/408; 359/480
(58) Field of Search .................... 359/611, 612, 359/610, 407, 408, 480–482; 206/316.1, 316.3; 224/908, 909

(56) References Cited

U.S. PATENT DOCUMENTS

| 4,773,747 | * | 9/1988 | Bresnahan | 359/408 |
| 4,865,191 | * | 9/1989 | Easter | 206/315.1 |
| 5,631,772 | * | 5/1997 | Mizukawa | 359/511 |
| 5,986,802 | * | 11/1999 | Byers | 359/408 |
| 6,095,328 | * | 8/2000 | Smithbaker, III et al. | 206/316.3 |
| 6,142,636 | * | 11/2000 | Nemoto et al. | 359/600 |
| 6,157,482 | * | 12/2000 | Koide | 359/408 |

* cited by examiner

*Primary Examiner*—Mohammad Sikder
(74) *Attorney, Agent, or Firm*—Malloy & Malloy, P.A.

(57) ABSTRACT

A protective assembly structured to protect an optical device, such as a pair of binoculars that include a pair of lenses, a pair of eye pieces, and a main body having at least a pair of interconnecting shafts extending from the lenses. The protective assembly itself includes a resilient material housing having a first and a second housing segments structured to receive a corresponding interconnecting shaft of the optical device snugly and protectedly therein. A distal end of the first and second housing segments defines a lens cover removably disposed in covering relation over a corresponding lens of the optical device, a pair of slits also defined in the resilient material housing in generally close proximity to the distal ends of the first and second housing segments sized and disposed to define the lens covers and to receive the lenses of the optical device therethrough, thereby allowing the lens covers to be displaced from their covering relation over the lenses of the optical device and allowing the optical device to be utilized without removal of the resilient material housing.

21 Claims, 2 Drawing Sheets

PROTECTIVE ASSEMBLY FOR AN OPTICAL DEVICE

BACKGROUND OF THE INVENTION

1. Field of the Invention

The present invention relates to a protective assembly specifically configured for use with an optical device, such as a pair of binoculars, the protective assembly providing some protective shielding for the often delicate optical device and especially the surface of a lens thereof, while still providing for convenience and effective use and gripping of the optical device in a generally conventional fashion. Furthermore, the protective assembly is configured so as to provide for effective and protective covering of the lenses and eye pieces of the optical device in a manner which allows for rapid, easy access and exposure of the lenses and eye pieces without risk of losing a lens cap or like protective articles, and without resulting in a hanging or dangling structure which may interfere with the convenient use and holding of the optical device.

2. Description of the Related Art

Optical devices, such as binoculars, telescopes, sites, and/or spy glasses are commonly used to facilitate viewing of articles in many industries and endeavors, including athletics, site seeing, hunting, etc. Because of the generally delicate nature of such optical devices, however, they are typically maintained or contained within protective pouches and/or carrying cases so as to provide for convenient storage and containment until use. Furthermore, such optical devices are typically fitted with individual lens caps which are temporarily placed in covering relation on the individual eye piece(s) and lense(s) of the optical device until viewing is desired, thereby guarding the lens and eye piece from scratches and impacts.

One primary draw back associated with the use of such conventional storage and protecting assemblies currently utilized with optical devices is the fact that in order to effectively utilize the binoculars or other optical device, they must be removed from the storage pouch or container. As a result, while being used, the optical device is no longer protected, and the pouch or container remains another article to be carried. Indeed, the reluctance to have to carry a pouch or container while the optical device is being used often leads to most users discarding and/or storing the protective pouch, merely carrying the exposed optical device, storing it such as by hanging around their neck utilizing a strap when not in use. Naturally, it is generally undesirable to leave such delicate and often expensive optical devices completely exposed and unprotected, especially if the user is undergoing some physical activity, as the hanging optical device is likely to bump into another device and/or be dropped thereby resulting in scratching and/or breaking of the optical device.

Yet another substantially common inconvenience associated with the use of optical devices includes the need for the utilization of lens caps. In particular, the optical apertures including the output lenses and the eye pieces are typically somewhat delicate and naturally should be protected and/or shielded from dust, scratching or other damage when the optical device is not being used. To this end, most conventional optical devices are fitted with a plurality of lens caps that fit over the particular optical aperture. When use of the optical device is to be employed, however, a user must remove each of the lens caps from its corresponding position, and must store the individual lens caps until needed. Naturally, this generally removable nature of the lens caps can provide a substantial inconvenience each time removal is required, as the individual lens caps are often highly susceptible to being lost or misplaced after removal, and when on the optical device they are susceptible to inadvertently falling off of the optical device. This is especially the case when the user does not utilize the storage pouch or other container. Moreover, even if a strap type structure is provided to tether the individual lens caps to the optical device such that upon their removal they hang or dangle from the optical device, such a configuration is generally seen as an inconvenience as the hanging articles can inhibit the normal use and manipulation of the optical device.

As a result, it would be highly beneficial to provide a protective assembly which provides for protective and secure containment of an optical device, thereby protecting it from impacts, scratches, and the like, but which is also configured so as to allow for convenient and conventional utilization of the optical device without necessitating removal of the protective assembly. Furthermore, it would be beneficial to provide such a protective device which provides for effective covering and shielding of the eyepieces and lenses, but which is further configured so as to facilitate rapid and effective utilization of the optical device when needed without risk of losing the protective structure, and without maintaining the lens protective structure in an awkward and/or dangling type orientation where it may obstruct and/or interfere with the convenient and comfortable use of the optical device.

SUMMARY OF THE INVENTION

The present invention relates to a protective assembly structured to protect an optical device, preferably of the type that typically includes at least one, but preferably a pair of spaced apart lenses, at least one, but preferably a pair of spaced apart eye pieces, and a main body, typically including at least one but preferably a pair of interconnecting shafts extending from the individual lenses towards the eye pieces. Specifically, the protective assembly preferably includes a resilient material housing. The resilient material housing is preferably somewhat integrally formed from a resilient, generally shock absorbent material, and in one embodiment includes a first housing segment and a second housing segment. More particularly, each of the first and second housing segments are structured to at least partially, and preferably snugly receive a corresponding one of the pair of the interconnecting shafts therein. As such, the resilient material housing can effectively contain and protectively shield the interconnecting shaft of the optical device in a manner which protects the optical device from damage, but which does not interfere with the normal gripping and manipulation of the optical device.

Furthermore, a distal end of both the first and second housing segments are preferably structured to define a corresponding pair of lens covers. The lens covers, which are preferably integrally formed of the resilient material with the resilient material housing, are structured to be at least temporarily disposed in covering relation over a corresponding one of the lenses of the optical device. Moreover, a pair of slits are preferably defined in the resilient material housing in generally close proximity to the distal ends of the first and second housing segments, so as to further define the lens covers. Specifically, the slits are sized and disposed to selectively be pulled over the lenses and a portion of the corresponding interconnecting shafts of the optical device so as to selectively receive the lenses of the optical device protruding therethrough and permit conventional use of the lenses. As such, the lens covers defined by the distal ends of the first and second housing segments are structured to be at least temporarily displaced from their covering relation over the lenses of the optical devices merely by pulling them over the lenses and allowing the lenses to protrude through the slits.

Also preferably provided with the resilient material housing of the present invention is a flap. The flap is preferably structured to selectively extend in covering, protecting relation over the eye pieces of the optical device. Furthermore, when in a removed position, the flap is also preferably structured to wrap around the main body of the optical device and be secured, such as by a fastener assembly, in an unobtrusive position, thereby effectively exposing the eye pieces for use and maintaining the flap in an out of the way position that does not inhibit normal use of the optical device.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
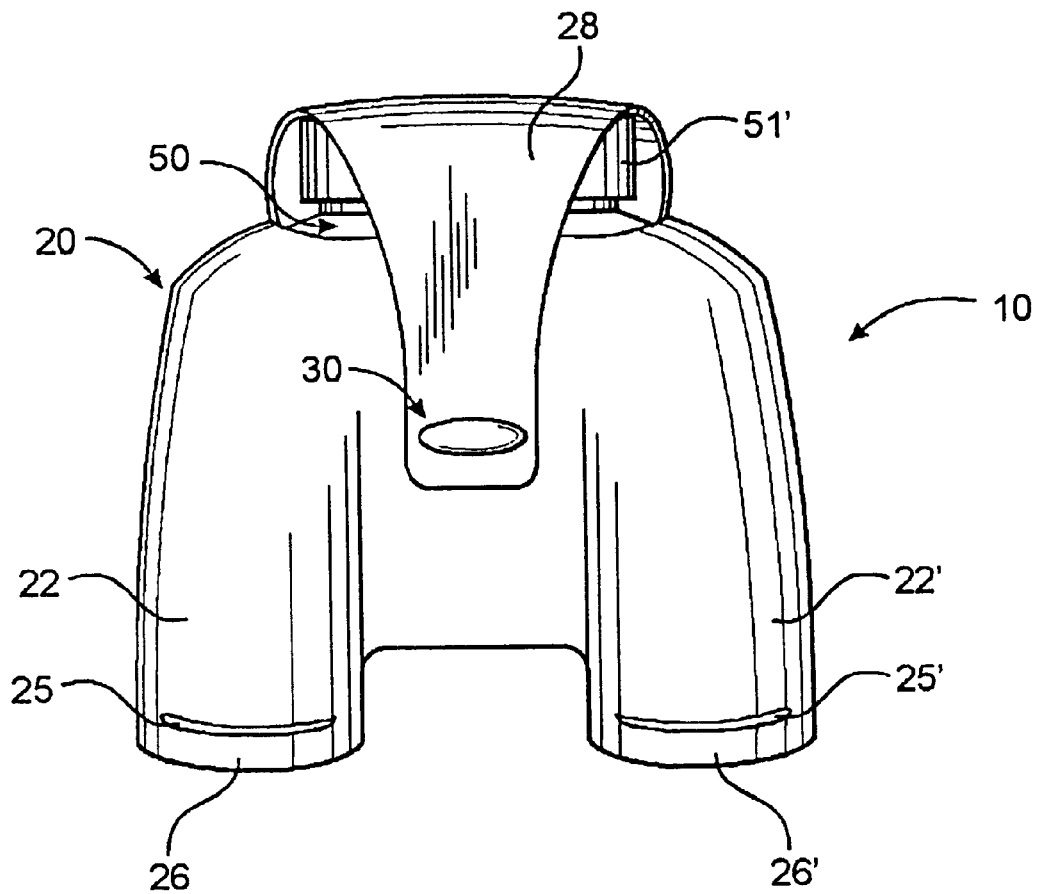
FIG. 1 is a perspective illustration of the protective assembly of the present invention operatively disposed in a protecting orientation on an optical device.

Shown throughout the Figures, the present invention is directed towards a protective assembly, generally indicated as 10. In particular, the protective assembly 10 is preferably structured for use so as to protectively, yet functionally contain an optical device 50, such as in the form of a pair of binoculars. Of course, it is recognized that the optical device 50 may include a spyglass, scope, range finder, or other alternative configuration. As such, the optical device 50 is preferably of the type which includes at least one eye piece 51, at least one lens 52, and a main body including at least one interconnecting shaft which extends generally from the lens 52 towards the eye piece 51.

Looking specifically to the protective assembly 10, it preferably includes a resilient material housing, generally indicated as 20. In particular, a resilient material housing 20 is preferably formed of a generally unitary construction and from a resilient shock absorbent type of material. For example, a ⅛ inch to ½ inch layer of a soft flexible rubberized material, such as neoprene utilized in wet suits, may be employed.

Figure 2:
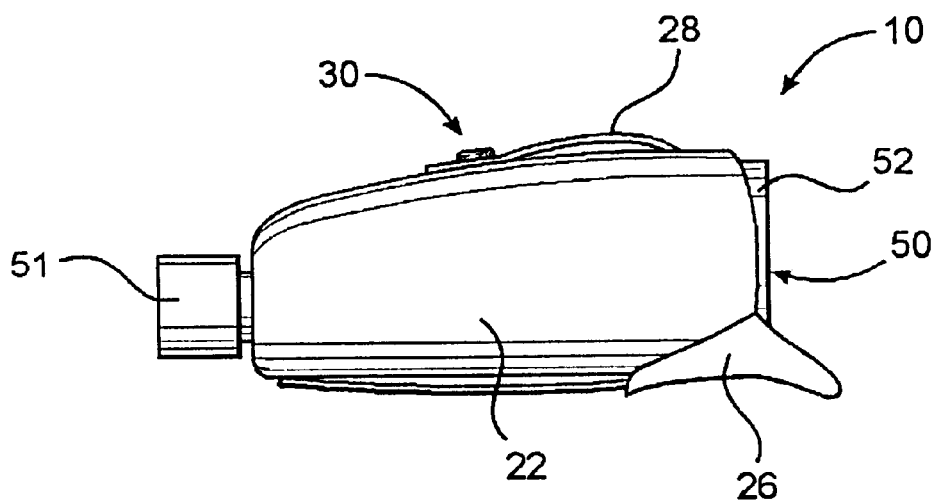
FIG. 2 is a perspective, side illustration of the protective assembly of the present invention disposed so as to allow operative utilization of the optical device protected thereby.

The resilient material housing 20 is structured to generally receive the optical device 50 within an open interior 21 thereof, in generally containing, protecting engagement, thereby preventing the optical device 50 from becoming scratched or damaged, and generally guarding against minor impacts thereto. Furthermore, the containment is preferably somewhat snug and/or form fitting so as to better protect the optical device against impacts, and so as to facilitate normal gripping and manipulation thereof in a conventional fashion when use is desired. When utilized to house a pair of binoculars as the optical device 50, the resilient material housing 20 preferably includes a first housing segment 22 and a second housing segment 22'. Also, in the illustrated embodiment, the first and second housing segments 22, 22' are preferably interconnected and integrally formed with one another and with a central housing segment 24 that can further define the resilient material housing 20. In this regard, each of the first and second housing segments 22, 22' are structured and disposed to operatively and protectively receive the interconnecting shafts of the main body of the optical device 50 snugly and securely therein. As mentioned, a generally tight, form fitting engagement is preferably provided, a generally elastic, resilient quality of the resilient material housing 20 providing for the effective snug engagement with the optical device 50. Moreover, defined at generally a distal end of each of the first and second housing segments 22, 22', is a lens cover 26, 26' respectively. Specifically, the lens covers 26, 26' are preferably integrally formed with the first and second housing segments 22, 22' of a like resilient, shock absorbent material. Furthermore, defined in the first and second housing segments 22, 22' so as to at least partially define the lens covers 26, 26' are a pair of slits 25, 25' respectively. In particular the slits 25, 25' are disposed in generally close proximity to the distal end of the first and second housing segments 22, 22', and are structured to selectively receive the lenses 52 of the optical device 50 therethrough when normal use of the optical device 50 is desired. Specifically, and as illustrated in FIGS. 1 and 2, when the optical device 50 is not in use, the lens covers 26, 26' generally define an enclosed end of the first and second housing segments 22, 22', thereby enclosing and covering the lenses 52 of the optical device 50. When, however, use of the optical device 50 is desired, the lenses 52 may be exposed through the slits 25, 25', which expand as needed and generally as a result of the resilient material construction, such as by pulling on the lens covers 26, 26' until the lenses extend completely through the slits 25, 25'. As such, by displacing the lens covers 26, 26' temporarily out of their covering position over the lenses 52, normal viewing out through the lenses can be achieved. Still, however, because the lens covers 26, 26' are integrally formed with the first and second housing segments 22, 22', they remain secured to the resilient material housing 20 and stowed in an un-obtrusive out of the way position that does not inhibit normal use of the optical device 50.

Figure 3:
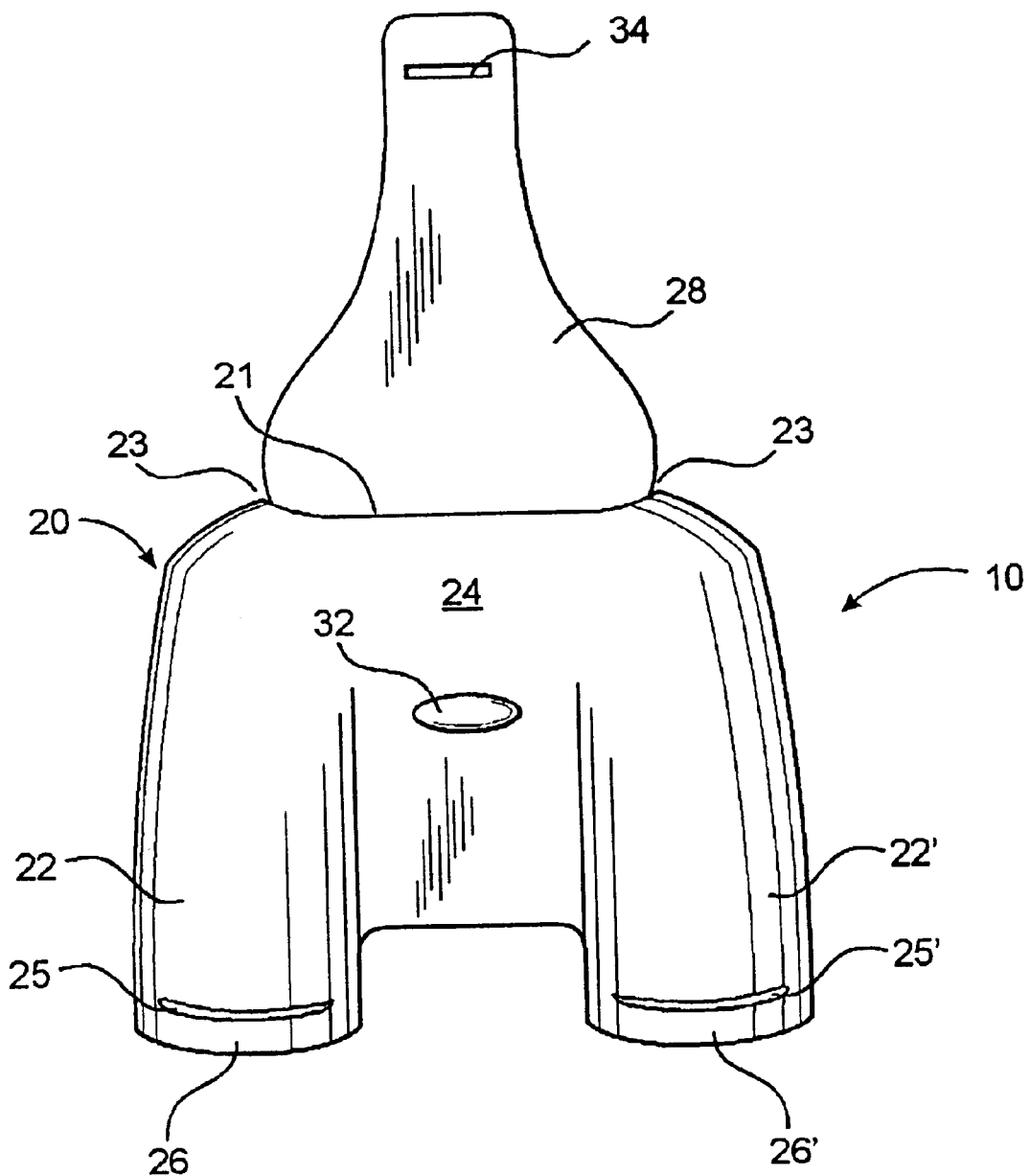
FIG. 3 is a perspective view of the protective assembly of the present invention in position ready to receive an optical device therein.

Additionally, the protective assembly 10 of the present invention, and in particular of the resilient material housing 20, also includes a flap 28. Specifically, the flap 28 is structured to selectively extend into covering relation over the one or more eye pieces 51, 51' of the optical device 50, thereby protecting the eye pieces, 51, 51' from impacts, scratches, dust and/or other damage. In the illustrated embodiment wherein the optical device 50 includes binoculars, the flap 28 preferably includes a generally widened region so as to properly overlie both of the pair of spaced apart eye pieces 51, 51'. Also, as shown in FIG. 3, however, one or more strap apertures 23 are preferably defined at generally a base of the flap 28. The strap apertures 23 are structured and disposed to generally expose clips or hooks normally disposed on the main body of an optical device 50, such as binoculars, such that a strap can extend therefrom. As such, neither the flap 28 nor the remainder of the resilient material housing 20 will inhibit normal use of a strap of the optical device 50, such as for hanging around the user's neck. Of course, if desired, a strap or belt clip type structure could be formed with and/or secured with the resilient material housing 20 so as to facilitate carrying of the optical device 50 contained therein.

The flap 28 is preferably integrally formed with the remainder of the resilient material housing 20 of the same shock absorbent, resilient material. Furthermore, the flap 28 is structured to be selectively disposed between a covering position, as illustrated in FIG. 1, and a removed portion, as illustrated in FIG. 2. When in the covering position, the flap 28 is preferably secured in its covering overlying relation over the eye pieces 51, 51' by a fastener assembly, generally 30. Although a variety of different fastener assemblies 30 may be incorporated, including the use of hook and loop type fasteners, snaps, clips, buckles, etc., in the illustrated embodiment, the fastener assembly 30 preferably includes a button 32 which is structured to extend through a corresponding aperture 34. Although a reverse orientation can be configured, in the illustrated embodiment, the button 32 preferably protrudes from the central housing segment 24, and the aperture 34 is defined at generally an end of the flap 28. In this regard, effective covering securement of the flap 28 over the eye pieces 51 and 51' can be achieved, as illustrated in FIG. 1. Conversely, however, when viewing through the eye pieces 51, 51' is desired, the flap 28 is further configured to wrap around the remainder of the resilient material housing 20, and as such, the main body of the optical device, so as to expose the eye pieces 51, 51' and preferably be secured in an out of the way, un-obtrusive position. In this regard, the flap 28 is preferably configured to wrap around and pass between the first and second housing segment 22, 22' so as to be secured, in its removed position, by the fastener assembly 30. Accordingly, the flap 28 wraps around, as illustrated in FIG. 2, and the aperture 34 defined therein can effectively pass over the button 32 to achieve securement in the removed position. Effective utilization of the optical device 50 can therefore be achieved in a conventional and easy to hold and manipulate fashion, yet no lens covers or other loose articles remain dangling or need be positioned elsewhere for possible loss. This characteristic, in conjunction with the previously mentioned snug, form fitting, resilient configuration of the resilient material housing 20 permits the effective holding and grasping of the optical device in a substantially conventional fashion, thereby facilitating its normal use despite its being maintained in a protected, shielded orientation.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described.

What is claimed is:

1. To protect an optical device of the type including at least one lens, at least one eye piece and an interconnecting shaft, a protective assembly comprising:
   a resilient material housing structured to receive the interconnecting shaft therein;
   a distal end of said resilient material housing defining at least one lens cover structured to be removably disposed in covering relation over the lens of the optical device;
   said resilient material housing further including a slit defined therein in close proximity to said distal end thereof, said slit sized and disposed to selectively receive the lens of the optical device therethrough; and
   said lens cover defined by said distal end of said resilient material housing structured to be at least temporarily displaced from said covering relation over the lens of the optical device upon the lens passing through said slit.

2. A protective assembly as recited in claim 1 wherein said resilient material housing is structured to substantially snugly engage the interconnecting shaft of the optical device so as to facilitate gripping of the interconnecting shaft in a conventional fashion.

3. A protective assembly as recited in claim 2 wherein said resilient material housing is generally shock absorbent.

4. A protective assembly as recited in claim 1 wherein said resilient material housing includes a flap extending from a proximal end thereof, said flap structured to be selectively disposed in covering relation over the eye piece of the optical device.

5. A protective assembly as recited in claim 4 further comprising a fastener assembly structured to selectively secure said flap in said covering relation over the eye piece.

6. A protective assembly as recited in claim 1 wherein said resilient material housing includes a first housing segment and a second housing segment, each structured to be disposed in receiving, covering relation over a corresponding one of a pair of interconnecting shafts.

7. A protective assembly as recited in claim 6 wherein said first and said second housing segments each include one of said lens covers removably disposed in covering relation over the lenses of the optical device.

8. A protective assembly as recited in claim 7 wherein said resilient material housing includes a flap extending from a proximal end thereof, said flap structured to be selectively disposed in covering relation over a pair of the eye pieces of the optical device.

9. A protective assembly as recited in claim 8 further comprising a fastener assembly structured to selectively secure said flap in said covering relation over the eye pieces.

10. A protective assembly as recited in claim 9 wherein said flap is further structured to be selectively removed from said covering relation over the eye pieces and to wrap around said resilient material housing into securing engagement with said fastener assembly so as to expose the eye pieces of the optical device.

11. A protective assembly as recited in claim 1 wherein said resilient material housing further includes at least one strap aperture structured and disposed to permit a strap to protrude therethrough from the optical device for convenient carrying of the optical device.

12. To protect an optical device of the type including a pair of spaced apart lenses, a pair of spaced apart eye pieces and a main body including at least one pair of interconnecting shafts extending from the lenses, a protective assembly comprising:
   a resilient material housing, said resilient material housing including a first housing segment and a second housing segment, each of said housing segments structured to at least partially receive a corresponding one of the pair of interconnecting shafts therein;
   a distal end of each of said first and second housing segments defining a lens cover structured to be removably disposed in covering relation over a corresponding one of the lenses of the optical device;
   said resilient material housing further including a pair of slits defined in said first and said second housing segments in generally close proximity to said distal ends thereof, said slits sized and disposed to selectively receive the lenses of the optical device therethrough; and said lens covers defined by said distal end of said first and said second housing segments structured to be at least temporarily displaced from said covering relation over the lens of the optical device upon the lenses passing through said slits.

13. A protective assembly as recited in claim 12 wherein said lens covers are integrally formed with said first and second housing segments of a resilient material.

14. A protective assembly as recited in claim 12 wherein said resilient material housing further comprises a flap structured to selectively extend into covering relation over the eye pieces of the optical device.

15. A protective assembly as recited in claim 14 wherein said resilient material housing includes a central housing segment interconnecting said first and said second housing segments and said flap, said first, second and central housing segments structured to receive the main body of the optical device therein.

16. A protective assembly as recited in claim 15 further comprising a fastener assembly structured to secure said flap to said central housing segment in covering relation over the eye pieces of the optical device.

17. A protective assembly as recited in claim 16 wherein said fastener assembly includes a button disposed on said central housing segment and structured to extend through an aperture defined in said flap.

18. A protective assembly as recited in claim 16 wherein said flap is structured to be disposed in a covering position and a removed position, said covering position being defined by said flap being disposed in said covering relation over the eye pieces, and said removed position being defined by said flap wrapping around said central housing segment and between said first and said second housing segments into engaging relation with said fastener assembly so as to be secured in said removed position and expose the eye pieces.

19. A protective assembly as recited in claim 12 wherein said resilient material housing is structured to substantially snugly engage the main body of the optical device so as to facilitate gripping thereof in a conventional fashion.

20. A protective assembly as recited in claim 12 wherein said resilient material housing is generally shock absorbent.

21. A protective assembly as recited in claim 12 wherein said resilient material housing further includes at least one strap aperture structured and disposed to permit a strap to protrude therethrough from the optical device for convenient carrying of the optical device.

* * * * *